June 29, 1954 — I. H. SELDEN — 2,682,576
TELEPHONE SYSTEM
Filed Jan. 20, 1951 — 5 Sheets-Sheet 1
FIG 1
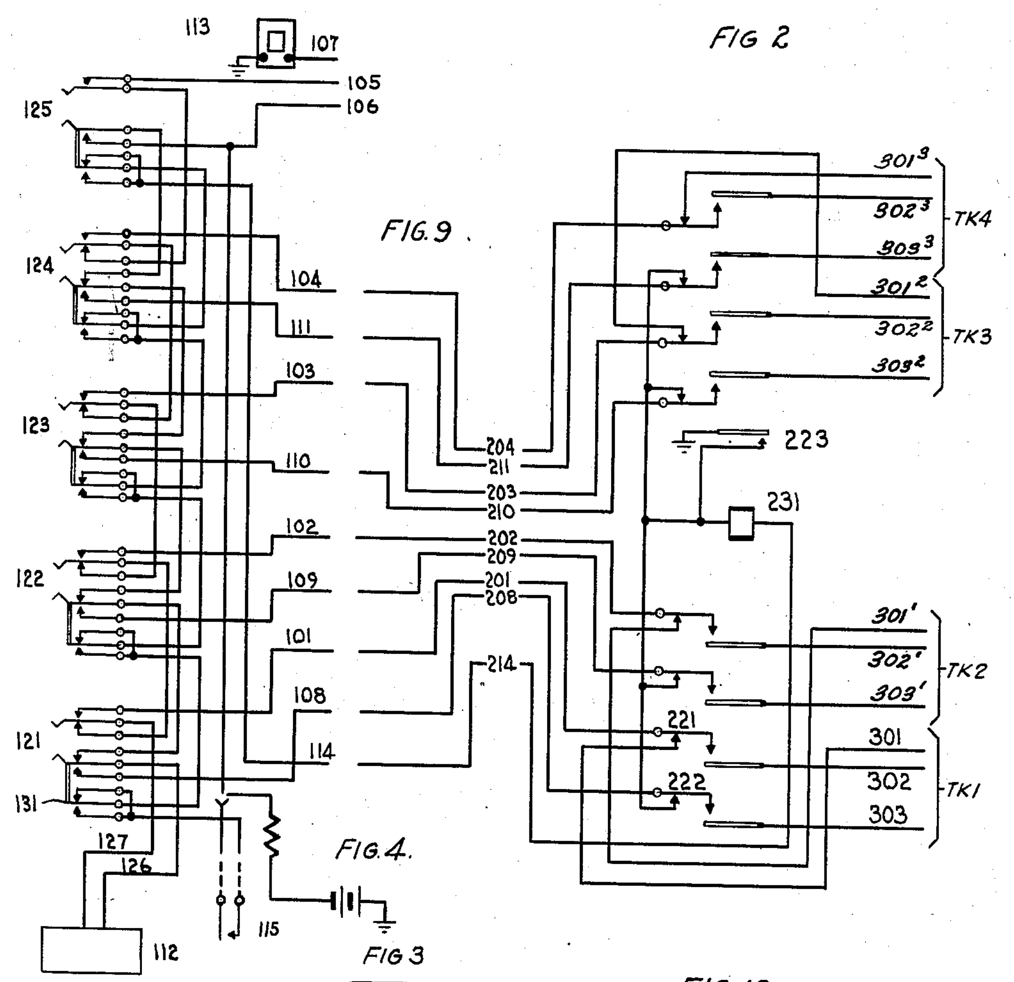
FIG 2, FIG. 9, FIG. 4.
FIG 3
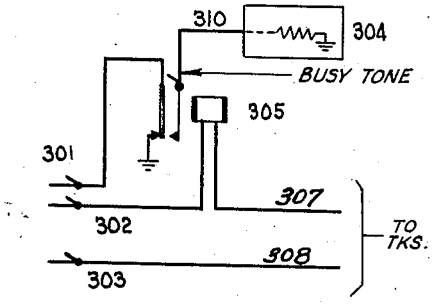
FIG. 10
| FIGS | FIG | FIG. 6 OR 7 | |
|---|---|---|---|
| 1+4 | 5 | FIG. 2 | FIG. 3 |
INVENTOR.
Irving H. Selden June 29, 1954 I. H. SELDEN 2,682,576

TELEPHONE SYSTEM

Filed Jan. 20, 1951 5 Sheets-Sheet 2

INVENTOR.

Irving H. Selden

June 29, 1954 I. H. SELDEN 2,682,576

TELEPHONE SYSTEM

Filed Jan. 20, 1951 5 Sheets-Sheet 3

INVENTOR.

Irving H. Selden

June 29, 1954 I. H. SELDEN 2,682,576

TELEPHONE SYSTEM

Filed Jan. 20, 1951 5 Sheets-Sheet 4

INVENTOR.

Irving H. Selden

June 29, 1954

I. H. SELDEN 2,682,576

TELEPHONE SYSTEM

Filed Jan. 20, 1951

5 Sheets-Sheet 5

INVENTOR.

Irving H. Selden

Patented June 29, 1954

2,682,576

UNITED STATES PATENT OFFICE 2,682,576

TELEPHONE SYSTEM

Irving H. Selden, Tacoma, Wash.

Application January 20, 1951, Serial No. 207,008

10 Claims. (Cl. 179—18)

This invention relates to telephone systems and particularly to small automatic intercommunicating systems, and refers particularly to that type of service supplying central office telephone terminations of one or more trunks or local switchboard lines at several different stations or extensions in an office or group of offices and also supplies automatic telephone intercommunication in which the selection of the code numbers of the various stations is done by the keying or push button method. Heretofore systems have been proposed in which the telephone designations assigned to telephone lines or trunk circuits have been selected by means of transmitting direct current impulses, usually by employing a dial. Inter-office selection of telephone code numbers has been speeded up by employing keying senders combined with register relays and timing means which together release impulses to operate the central office switches at a distant exchange.

This system contemplates the application of the trunk pick up keys at the stations operated in combinations to select code numbers after a local or intercom button has been operated which will energize a transfer relay that will transfer the trunk pairs at a common equipment cabinet, to select leads in the intercommunication system. Since the stations in such an arrangement usually are close to each other the same cabling that is provided to connect the various trunks to the stations is utilized by means of the transfer relay. Thus by employing the large amount of conductors available a simplified selecting arrangement is made possible. However, the central office connections are not indispensable to the operation of the intercommunicating circuits nor vice versa.

The primary objects of this invention are to provide a cheaper, simpler, more reliable and faster means of intercommunication in a twelve and thirty-six station system. In push button selection there is a novel modern advancement in communication appealing to a modernistic public eager for new and faster means of communication.

Heretofore, telephone systems of the push button selecting type have usually used buttons and conductors not associated with the trunk conductors and the stations were wired directly to each other, whereby selection was made by one button only and the talking circuit consisted of a single talking link frequently common to all stations.

Other more modern automatic telephone systems use a dial which is slow and tedious to operate and is usually associated with very complicated selecting circuits which are not always reliable or cheap to maintain. An audible signal is usually used which is operated by an interrupted ringing current which causes further delay after the called number has been dialed.

In this system the stations are assigned code numbers which are selected by operating combinations of 2 or 3 of the trunk pick up buttons. In the twelve station system 2 digit numbers are used and in the 36 station system 3 digit numbers are used and immediately after selecting the last digit, the audible signal at the called station starts, thus elminating every possible delay in completing a call.

Other objects of the intercommunicating system are: to provide a local talking circuit such that a calling party while talking may be signalled on his local circuit and upon completion of his first conversation can depress his local button and accept the next call; and To provide an intercommunicating circuit inaccessible to other stations without special pickup features. In designing an automatic thirty-six station system, a field is touched that is insufficiently covered at the present time. This system also provides a local circuit adaptable to many optional features or modifications and imposes no handicap on the trunk circuit arrangements, thus giving the utmost of flexibility to the stations connected or grouped in the intercommunicating arrangement.

This system also proposes an automatic trunk lock-out feature whereby only one station can have access to an outside trunk at one time. This feature is optional but is imperative to any telephone system that has several central office dial trunk terminations and extensions, for it not only insures privacy but prevents calling wrong numbers due to interruptions while one subscriber is dialing and another subscriber lifts the receiver of a station which may be connected to the same trunk the subscriber is dialing on.

The invention has been illustrated in connection with the following drawings in which:

Figs. 1 to 7 show the various features of the invention applied in detail to a small capacity automatic telephone system.

Fig. 1 shows the wiring of the pick up key circuit, the local calling buzzer and the extra switchhook contact, which is part of an instrument. There is no instrument shown.

Fig. 2 shows the trunk lock-out relay.

Fig. 3 shows the trunk busy relay.

Fig. 4 shows a battery supply lead to be used in the trunk lock-out circuit of any stations that may not be connected to the intercommunicating equipment.

Fig. 5 shows the station relay circuit of one station, together with its trunk transfer relay and talk link transfer relay.

Fig. 6 shows in part the selecting circuit of the twelve station system common to all, together with a talk link busy lamp, a talk link busy relay and the selecting link busy relay.

Fig. 7 shows in part the selecting relays for a thirty-six station system together with a talk link busy lamp, a talk link busy relay and the selecting link busy relay.

Fig. 8 shows schematically how the locals are grouped numerically by their first digits for push button selection and by their last digit numerically for the talk links. Fig. 8 is abbreviated to facilitate a simple description of the selecting process to give a ready overall understanding of the mechanism.

Fig. 9 is a schematic to simplify description and show how the trunk circuit would connect if no intercommunicating circuit were required.

Fig. 10 is a block diagram showing how the figures are related to each other.

The busy tone circuit and dial tone circuit are not shown. Any tone circuit is adaptable that has low resistance to ground on the dial tone circuit and high resistance to ground on the busy tone circuit. It must be such a circuit as will start or furnish dial tone when battery is imposed on the dial tone lead or busy tone when battery is imposed on the busy tone lead.

In a 12 station system the local code numbers are 12, 13, 14, 21, 23, 24, 31, 32, 34, 41, 42, 43. There can be no numbers such as 11, 22, 33, or 44 because in most present types of key equipment the keys are so constructed that a pick up key will stay depressed until a subsequent key is pressed, thus no double code numbers can be used.

Figure 8:
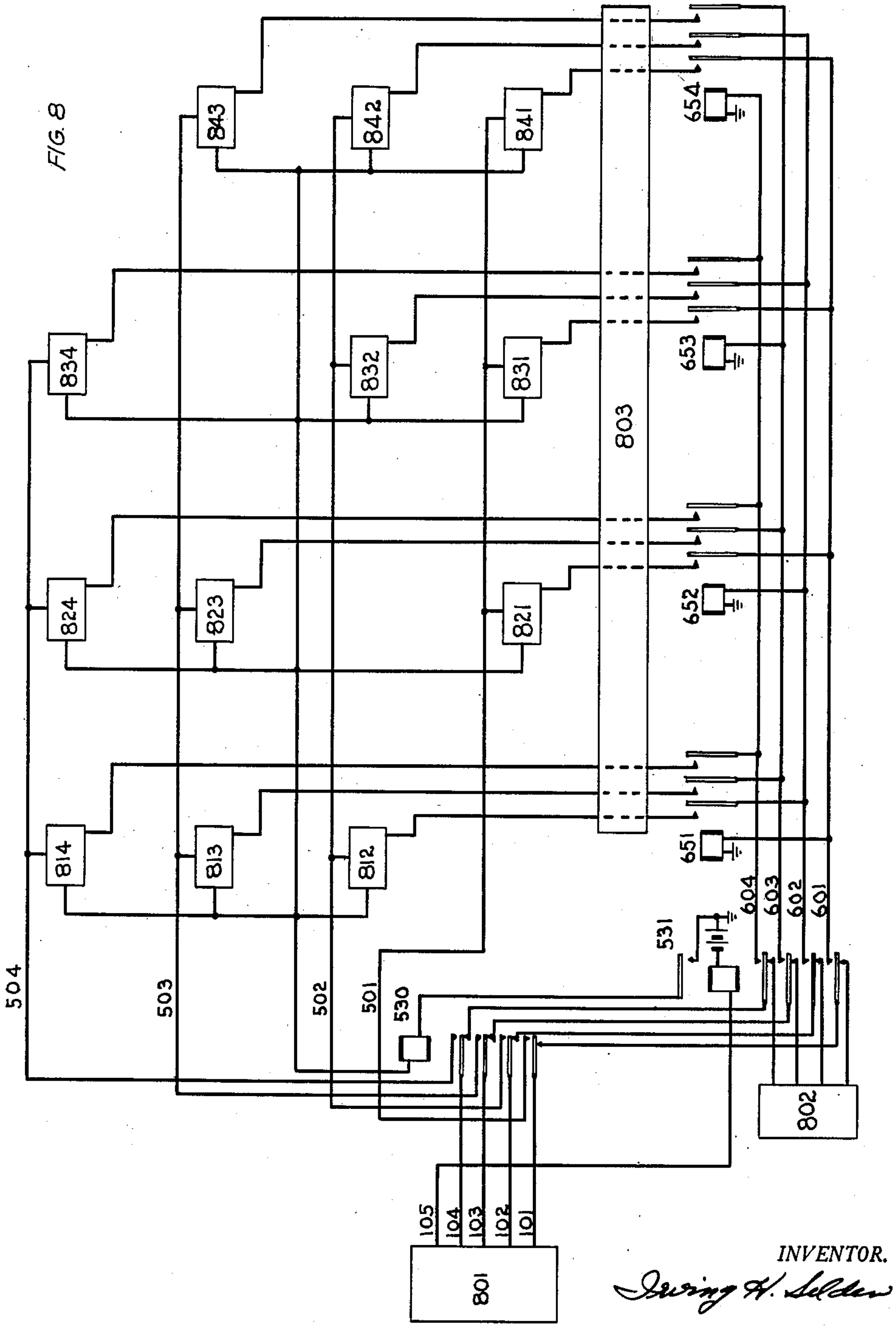
Fig. 8 shows diagrammatically the numerical grouping of the locals according to their first digit for selection and by their last digit for talking.

In Fig. 8 the leads 101, 102, 103, 104, and 105 terminate at a telephone represented by 801 consisting of a telephone circuit connected to 4 central office or switchboard lines and one local line by means of 5 pick up keys which may be either internally or externally mounted with the telestation circuit.

The leads 101, 102, 103, 104, and 105 represent cable pairs and with relays 530 and 531 both normal the local station can have access to any of 4 central office trunks or switchboard lines 802.

With the receiver off the hook when the fifth or intercommunicating button is depressed ground is fed out on lead 105 and operates relay 531. Relay 531 operated transfers leads 101, 102, 103, and 104 from central office circuits to select leads 601, 602, 603, and 604 and prepares the operating path for relay 530.

Relay 531 operated locks operated under control of relay 530 and an extra switchhook contact in the telephone set. This circuit is not shown.

As is apparent in Fig. 8, local 12, 812, 13, 813, and 14, 814, are grouped under control of relay 651 which might be designated V1 (signifying vertical group 1 or 10's group). Relay 652 would be designated V2 for vertical group 2 or 20's, 653 would be V3 and 654 would be V4.

Thus if the calling party now wished to select station 12, 812, he would then depress trunk key 1. By so doing battery is placed on lead 101 which would then operate relay 651, V1. Relay 651 operated locks under control of relay 531, circuit not shown, and prepares a select path to station relay circuits of stations, 12, 13, and 14 represented by 812, 813, and 814 after passing through link busy test circuits represented by 803.

The calling party next depresses the trunk 2 button associated with lead 102 which operates a relay in the station circuit of station 12, 812. This causes another relay in said station circuit to operate completing operating circuit of relay 530 and operates an audible signal at called station. Relay 530 (talk link transfer relay) operated releases relay 531 and 651 and transfers leads 101, 102, 103, and 104 from the selecting link to talk links 501, 502, 503 and 504 respectively.

With the operation of a line relay in the station circuit of 812 when the receiver is lifted at said station, said circuit is connected to talk link 2, 502, and since the calling party has just pressed trunk button 2 his station circuit is also on talk link 502. Independent battery feeds supply talking battery and the talking circuit is established with 2 condensers in the called station circuit.

To make possible this talk link arrangement the stations are grouped according to their last digit for the four talk links thus, 814, 824, and 834 are on talk link 4, 504. Also 813, 823 and 843 are on link 3, 503. 812, 832 and 842 are on link 502 and 821, 831, and 841 are on talk link 501. Thus it can be seen there are 4 horizontal talk links with the stations grouped according to their last digits and 4 vertical select groups in which the stations are grouped according to their first digits.

The system as disclosed in Figs. 1 to 8 comprises an automatic push button selecting arrangement which utilizes the extensions of central office trunks or local switchboard lines from their common equipment by transferring these said leads from trunk circuits to selecting leads and talking leads which terminate in a common group of relays and by the use of code numbers it is possible to select any one of 12 stations in the first case or 36 stations in the second case by the use of different number combinations of the 4 pick up keys at any station in the system. Thus it can be seen the trunk conductors together with the pick up push buttons are utilized in a simplified selecting circuit, in which only one station can place an inter-office call at one time. However, this process is rapid, taking only long enough to press 2 or 3 buttons as the case may be, then the selecting circuit is released for the next call. The 12 station system requires only 2 digit code numbers while the 36 station system requires 3 digit code numbers.

The flexibility of this equipment is brought out by the fact that in a 12 station system it would be possible for as high as 48 different outside trunks to terminate in the equipment without any effect whatever on the intercommunicating features. Any station may have access to from none to four outside lines. Any station may either be equipped with a dial in dial exchanges or not equipped whichever the needs of the service would require.

To pick up another station's local calls, all that is required is a transfer key to pick up the local circuit, that is, the tip and ring of any station's local line.

*Station to station call, twelve station system*

The pick up keys in the station circuit would be coded 1, 2, 3, 4, and local and are shown as 121, 122, 123, 124 and 125.

To illustrate the operation of the circuit in making a station to station call it will be assumed that the subscriber at any station such as shown in Fig. 1, desires to communicate with station 812, the code number of which is 12. To do this he operates local key 125 and removes the receiver, not shown, from the switchhook, not shown, of the station circuit 112. Trunk transfer relay 531, which is of the slow to release type, operates on a circuit traced from battery on the winding of relay 531, through an upper back contact of 530, through the lower outer back contact of 532, over lead 106 through inner lower front contact of key 125, through normally made back contacts of remaining pick up keys and enters the station circuit 112 on lead 126, through the station circuit and out on lead 127 through upper inner back contacts of first 4 pick up key and upper front contact of key 125, over lead 105, upper outer back contact of relay 531, lower middle back contact of relay 532, lead 608 to back contact of relay 655, to ground on lead 606 through a repeating coil, not shown, in the common tone circuit 657. Relay 531 operated locks under control of an extra switchhook contact 115 of the calling station circuit.

The circuit for this function is traced from ground through a resistance 520. This resistance is sufficient so as not to shunt the sound of dial tone from lead 105 nor release dial tone relays. Through lower outer front contact of relay 531, outer lower back contact of relay 530, over lead 114, outer lower front contact of pick up key 125, through a chain or series circuit of the other pick up keys to extra switchhook contacts 115 to the ring side of the local pair lead 106 thence over the original operating path of relay 531 to battery, holding relay 531 operated under control of the switchhook or relay 530.

With the operation of relay 531 lead 105 at upper outer swing contact of relay 531 is transferred from lead 608 to lead 606. Lead 606 is also a dial tone lead, consequently the calling station will receive dial tone since his station circuit is still in series with the operating path of relay 531 previously described.

With the operation of relay 531 leads 101, 102, 103 and 104 are connected through to leads 601, 602, 603, and 604 respectively. Leads 108, 109, 110 and 111 are now connected with the battery standing on the winding of relay 531.

Wishing to select code number 1, the calling station now depresses pick up key 121 which operates relay 651 in the following manner.

Ground on the winding of relay 651 over lead 601, through a lower front contact 541 of relay 531 to lead 101. Key 121 is operated. Into the station circuit over lead 127 out on 126 which is connected with lead 108 which has battery standing on it from contact of relay 531. Relay 651 locks through its inner contact to lead 605, which has battery on it from upper outer back contact of relay 530. Relay 651 prepares the selecting path for stations 12, 13 and 14 shown as 812, 813 and 814.

The next digit selected is 2 by depressing key 122. In pressing key 122 battery from a contact of relay 531 to lead 109 through the station circuit is fed out over lead 102 to lead 602. 602 connects with lead 662 at relay 651. Lead 662 through lower outer back contacts of relay 656, over lead 612, to ground through winding of relay 534.

Figure 5:
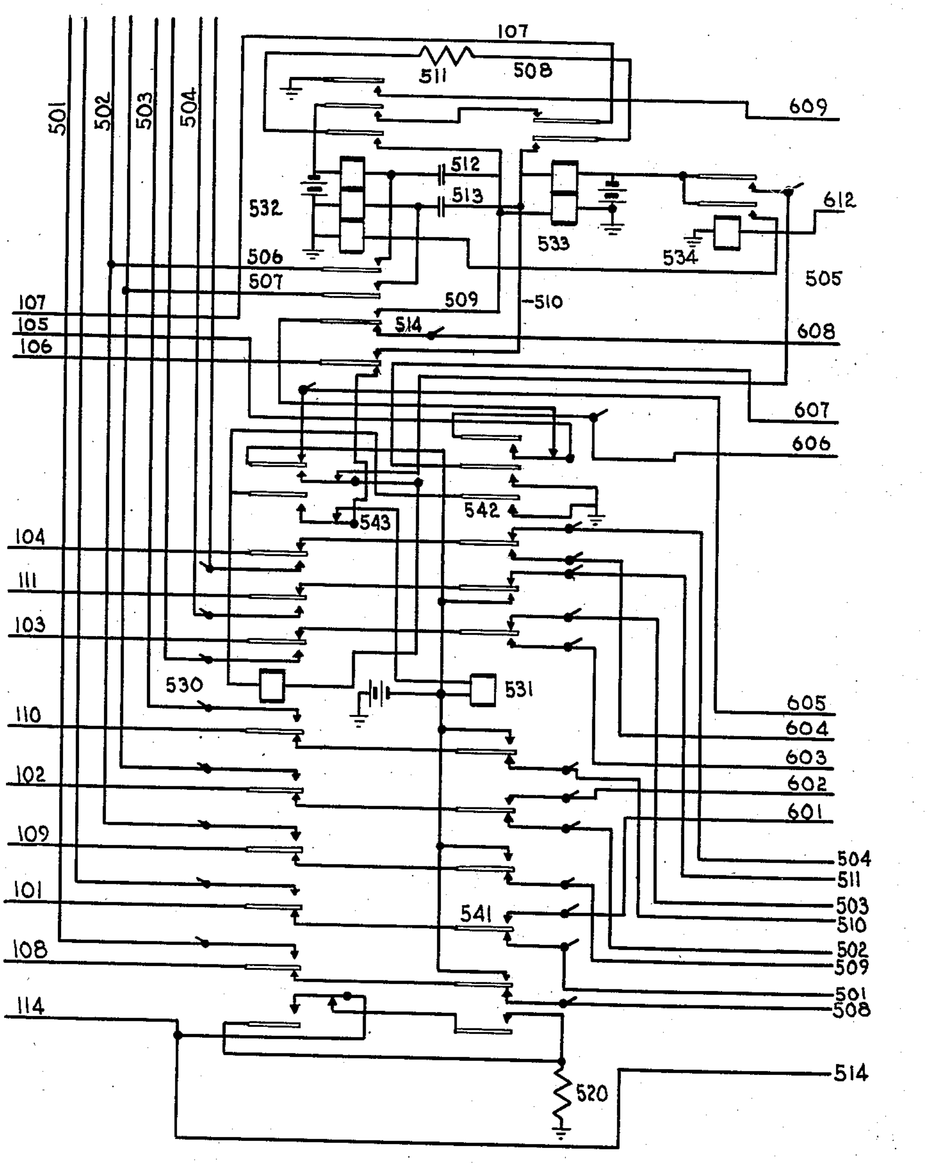

Consider Figs. 1 and 5 to be that of both the calling station and the called station. In a completed call relay 530 is the only relay operated in the calling station circuit. In the called station circuit the line and cut off relays 533 and 532 are the only relays operated, thus in considering Figs. 1 and 5 as being equipment for both the called party and the calling party the only common part would be Fig. 1. The calling station's station circuit will be on pick-up key 122 and the called station will be on pick-up key 125.

Relay 534 operates, closes the operating path of relay 532. Relay 534 also operates relay 530 of the calling station. Lead 505 multiples at all relays 534 and all relays 530. The relay 530 of the calling station is the only one the mate of which the transfer relay 531 is operated since only one subscriber can originate a call at one time.

Relay 531 prepared the operating path of relay 530 by placing ground on one side of the winding of relay 530 at an upper contact 542 of relay 531, consequently the relay 530 of the calling station is the only one that will operate. Relay 530 operates and releases relay 531 in opening back contact 543 of relay 530. Relay 530 transfers the locking ground 520 from relay 531 to its lower outer front contact which locks relay 530 under control of the extra switchhook contact the same as previously described for relay 531.

Relay 530 releases relay 651, upper outer contact of relay 530 and lead 605. Relay 651 released, releases relay 534. Relay 530 transfers the selecting leads to the four talk links 501, 502, 503, and 504. Relay 530 operated also releases the select link circuit so that the next station can place a call. The calling station 112 with associated select key 122 operated is now bridged across leads 102 and 109, which are now connected at relay 530 with talk link 502. Consequently the calling station 112 is bridged across talk link 502. Relay 532 of the called station circuit operated, locks operated by leads 506 and 507 and the station 112 bridged across said talk link.

Operation of cut off relay 532 of the called station opens the operating path of relay 531 at the two lower swing contacts of relay 532 and prepares the operating circuit to the line relay 533 in the called stations circuit in cutting leads 105 and 106 through from intercommunicating pick-up key 125 of the called station.

The operation of relay 532 operates a buzzer, such as 113 at the called station, by a circuit traced from ground through buzzer 113 over lead 107, upper outer back contacts of relay 533, upper middle front contacts of relay 532 to battery.

This schematic drawing implies that direct current relay battery is used. However, 60 cycle alternating current which is preferable could be used. If the needs of the service require, a bell could replace the buzzer and 20 cycle generator current could replace the battery at upper middle front contacts of relay 532.

The party at the called station answers by depressing the local or intercommunicating button represented by 125, Fig. 1. In so doing his station such as 112 is bridged across the leads 105 and 106 associated with station code 12.

This station bridge operates relay 533. This circuit is traced from battery on the upper winding of relay 533 over lead 510 to lead 106 through lower outer front contact of relay 532. Through the station bridge from lead 106 back on 105 through upper outer back contact of relay 531 through a lower middle front contact of relay 532 to lead 509 to ground on the lower winding of relay 533. Relay 533 operated opens the operating path of the buzzer circuit to the called station at lead 107 upper outer back contact of relay 533. Relay 533 operated locks operated under control of relay 532.

This locking circuit is traced from battery on the upper winding of relay 533, through upper inner front contact of said relay, through resistance 511 through upper inner front contact of relay 532 to lower winding of relay 533 to ground.

The object of this locking bridge is to prevent a recall at the called station in case the called station should restore his receiver first. The resistance of resistance 511 is sufficient to hold relay 533 operated when the receiver is restored at the called station and sufficient to not shunt down the talking circuit when the called subscriber is talking.

When both subscribers are connected and talking the calling station is supplied with talking battery from relay 532 of the called stations relay group. The called station gets talking battery from its associated relay 533. The talking circuit is completed with condensers 512 and 513.

*Station to station call, select link busy*

If a subscriber attempts to make a call when the select link is busy a previously operated relay 531 would still be operated. A relay 531 operated, closes the operating circuit of relay 655, in the following manner. Battery on the winding of relay 655, over lead 607 to ground on an upper contact of relay 531. The operation of relay 655 transfers lead 608 from dial tone lead 606 to busy tone lead 660. Thus lead 608 will now have busy tone on it as will all leads multipled with lead 608 at relays 532. As before mentioned each station connected with the common equipment and wired for station selection will also be equipped with each of the 5 station relays shown in Fig. 5.

Thus each of the 12 relays 532 would have busy tone on its contact 514. Consequently if a subscriber at any other station at this moment were trying to select another station he would receive only busy tone instead of dial tone and could not operate his relay 531 since the resistance to ground through busy tone is greater than the amount of resistance to ground through dial tone.

*Station to station call, talk link busy*

Since there are only four talk links it can be observed that in a twelve station system there would be three stations on each talk link as far as incoming calls are concerned. However if one station in a talk link group is connected on an incoming call the other two stations may still originate calls but cannot receive any incoming calls as long as their called talk link is busy. Although each group of three has a common talk link the conversations on said talk links are absolutely private for there is no way another subscriber may have access to said talk link when it is busy unless he has a transfer key especially wired to pick up calls of another station.

To prevent a double connection each talk link has a talk link busy relay such as relay 656. Relay 656 as shown is the talk link busy relay for talk link 2, 502. As before stated the stations on talk link 502 are 812, 832 and 842 code numbers 12, 32 and 42.

Figure 6:
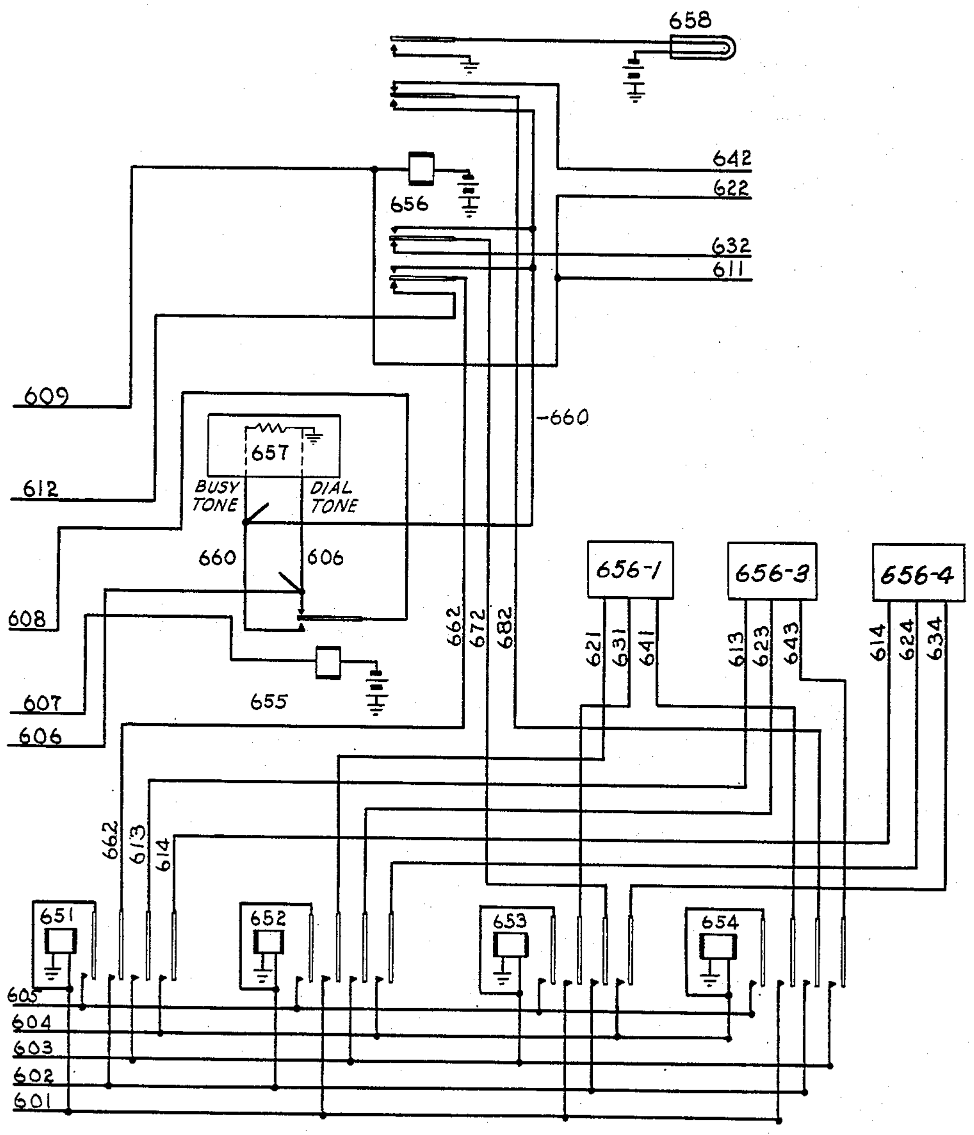

In Fig. 6, it can be seen that a ground on any one of three leads, 609, 611 or 622 would operate relay 656. Lead 611 is associated with the station circuit of 832, not shown. Lead 622 is associated with the station circuit of 842, not shown, and lead 609 is associated with station circuit 812 which may be considered as the station circuit shown in Fig. 5.

If the station circuit of 812 as here represented were busy as a result of having received a call then relay 532 would be operated as previously described. Upper outer contact of relay 532 places a ground on lead 609 and operates relay 656. It is obvious that any subsequent calls to talk link two would come over vertical select relays 651, 653 or 654 and eventually over leads 662, 672 and 682. With relay 656 operated, then leads 662, 672 and 682 would all have a busy tone standing on them since lead 660 is a busy tone lead connected to the common tone circuit 657.

Since all selections are made with battery on the ring side of the selecting circuit in series with said station circuit out over the tip of the line, then with the selection of the second digit no matter which of the three code numbers may have been selected the tip of the station circuit would be connected to ground through busy tone and the calling station would receive a busy tone signal.

When a station originates a call the 530 relay is the only station relay in its own group that remains operated and since the local button is released with the subsequent pressing of the next select key the subscriber is not on his local circuit when his call is completed but on the circuit or talk link of the last button he has pressed. Consequently he may still receive an incoming call on his local circuit. Relays 532 and 533 remain operated in the called station circuit during conversation and are held under control of the calling station's bridge.

Figure 7:
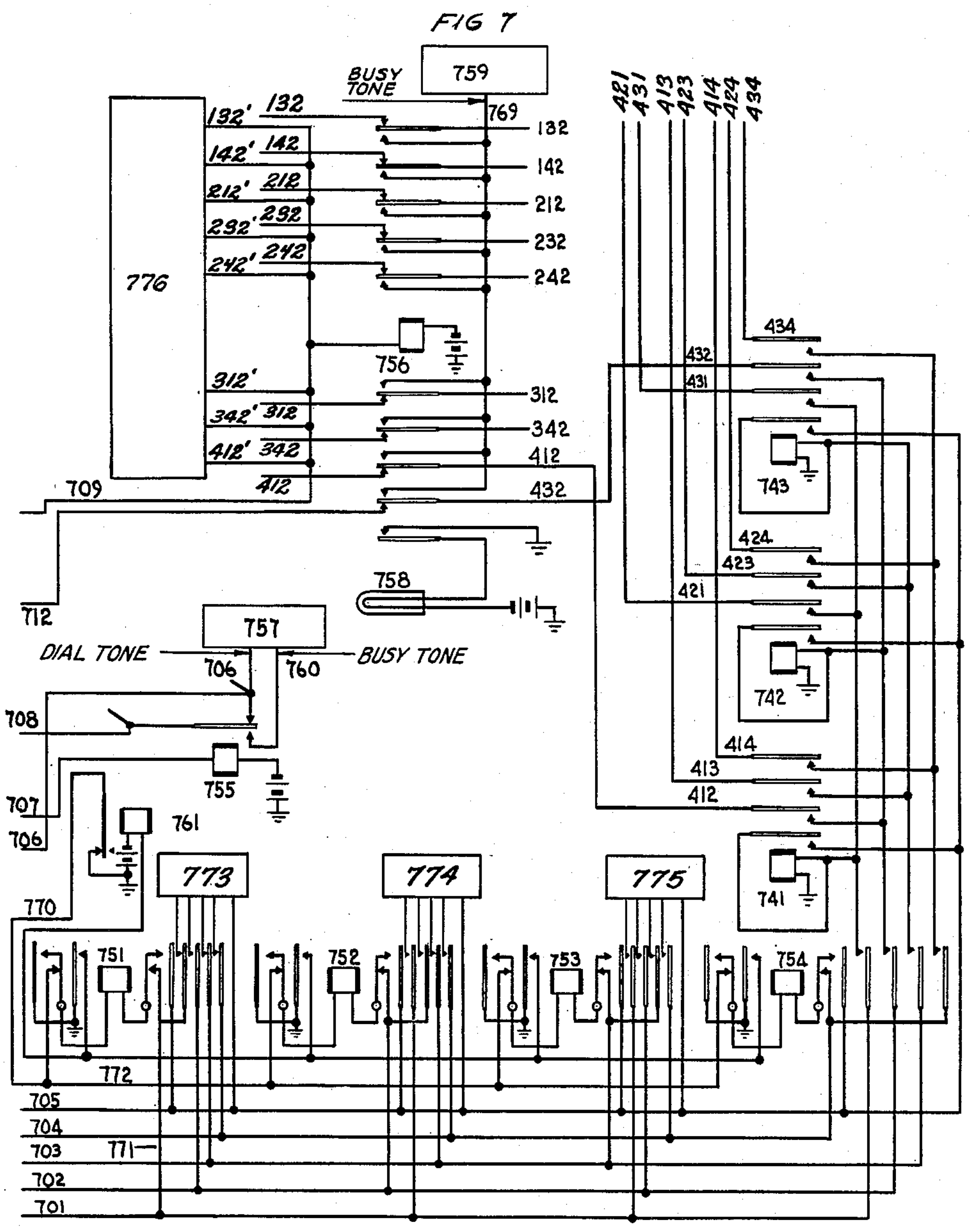

Busy lamps 658 and 758 as shown in Figs. 6 and 7 are self explanatory and may be connected to any talk link busy relay to show which station circuits are not clear to accept calls.

Although Fig. 8, in simplifying the selecting circuit diagrammatically shows the grouping of the stations by their first digit in vertical groups, Fig. 6, is apt to be confusing in that after passing relays 651, 652, 653 and 654 the select leads are shown grouped by their last digit to simplify the schematic circuit extending to the talk link busy relays. 803 represents the grouping of all relays 656 in Fig. 8, however Fig. 8 is a true picture of the numerical grouping of the stations. In Fig. 6, boxes 656—1, 656—3 and 656—4 represent talk link busy relays similar to relay 656 with their respective select leads 621, 631 and etc.

*The thirty-six station system*

Fig. 7 shows partially the selecting link of the 36 station system together with a select link busy relay, 755, and a talk link busy relay 756, and talk link busy lamp 758.

The thirty-six station system is designed on the same principle as the twelve station system previously described. It has four talk links and one select link. The station circuits and station relay groups are identical as are the central office trunk features. With trunk pick up keys numbering 1 to 4, it is necessary to use three digit code numbers in order to get 36 different combinations from four keys so numbered without any double numbers being permitted due to the construction of most pick up keys.

For selection the code numbers are grouped by their first digits thus: 121, 123, 124, 131, 132, 134, 141, 142, and 143. The second group: 212, 213, 214, 231, 232, 234, 241, 242, and 243. The third group: 312, 313, 314, 321, 323, 324, 341, 342 and 343. The fourth group: 412, 413, 414, 421, 423, 424, 431, 432 and 434. Refer to Fig. 7 and compare to Fig. 6. Since the selecting principle is the same, then it follows that all numbers the first digit of which is 1 will be selected through relay 751 which is similar to relay 651. The second group each number of which has 2 for its first digit will be selected through relay 752. The threes group through relay 753 and the fours group through relay 754.

Since we now have three digit numbers as compared to two digit numbers in the twelve station system it follows there will have to be an additional selecting step which numerically has to be an intermediate one. It follows then that in each vertical group as determined by the first digit, see Fig. 8, there will have to be three succeeding divisions made in which the numbers are grouped according to their second digit.

As previously stated, numbers 412, 413, 414 and 421, 423, 424, and 431, 432, and 434, all will be selected through relay 754. By grouping these numbers by their second digits as just listed we have our basis for selection of the intermediate digits. Consider leads 701, 702, 703, 704 and 705 to be the same as leads 601, 602, 603, 604 and 605 and it follows that relay 751 may be operated under control of select or pick up key 121, relay 752 by key 122, relay 753 by key 123 and relay 754 by key 124.

Referring now to the fourth vertical group suppose that a number is being selected and key 124 has been depressed and relay 754 is locked operated, it is now obvious with relay 754 operated, that relays 741, 742 and 743 can be operated under control of pick up buttons 121, 122, and 123 and leads 701, 702 and 703 respectively. It follows that code numbers 412, 413 and 414 will be selected through relay 741. Numbers 421, 423 and 424 through relay 742 and numbers 431, 432 and 434 through relay 743.

When the second digit relay has been selected and locked through its winding to lead 705, the third digit is selected, the same as the second digit in the twelve station system. For after the numbers are grouped by the second digit for the intermediate selecting step they are then regrouped by their last digit for the four talk links, thus: 121, 131, 141, 231, 241, 321, 341, 421, 431 are connected to talk link 1 and these leads must pass through a talk link busy relay such as shown in Fig. 7, relay 756, before passing over a station select lead such as 712 which is the same as 612. Lead 712 would select and operate the station relays of station 432. Relay 756 is the talk link 2 busy relay.

Stations 132, 142, 212, 232, 242, 312, 342, 412 and 432 are grouped on talk link 2 and their corresponding select leads pass through the contacts of the talk link 2 busy relay shown as 756. Station select leads 123, 143, 213, 243, 313, 323, 343, 413 and 423, are in group 3 and 124, 134, 214, 234, 314, 324, 414, 424 and 434 are in group 4.

In Fig. 7, 757 and 759 represent the common tone circuit and lead 769 is a busy tone lead at 759. Relay 761 is a ground release relay placed in the 3 digit system to prevent subsequent operation of a second and third vertical relay or subsequent relays upon selection of the last two digits.

The function of relay 761 is described as follows: If the first digit selected were a 1, by operation of key #121, then relay 751 would operate. Its operating path would be from battery on lead 701, through the winding of relay 751 through a left hand middle back contact of relay 751 over lead 770 to ground through contacts of relay 761.

Relay 751 operated operates relay 761 in a circuit traced from ground on left hand front contacts to battery through the winding of relay 761. Relay 751 operated transfers from its operating path to a locking path which releases lead 771 to be subsequently used in the selecting of the last digit of three code numbers in this vertical group. The locking path is traced from battery on lead 705 which is the same as lead 605, through right hand inner front contact of relay 751, through the winding of relay 751 to ground through left hand outer front contacts of said relay. Since battery on lead 605 is under control of relay 530 then relay 751 is locked under control of relay 530 and relay 761 is locked operated under control of relay 751. Relay 761 operated disconnects the ground from lead 770. Consequently there can be no subsequent operation of any of the vertical group relays after the first one has operated since the operating and locking paths of all said relays are the same. This was deemed necessary in the first step of the 36 station system on account of the three digits but does not seem practical for the 12 station system or the second digit of the 36 station system.

In Fig. 7, boxes 773, 774 and 775 represent the select leads and second digit relays such as the drawing discloses above first digit relay 754.

At relay 756 leads 709 and 712 are similar to leads 609 and 612 in Fig. 6. Lead 712 is the select lead for code number 432. Lead 132 is the select lead for code number 132 and lead 142 for code number 142 etc. Their mate leads 132' and 142' etc., have the same function as lead 709.

Leads 421 and 431 are select leads for code numbers 421 and 431 but must pass through a link busy relay similar to relay 756, but for talk link 1. Leads 413 and 423 pass through a similar relay as do leads 414, 424 and 434.

In the 36 station system there are nine stations per talk link. However this only effects incoming calls since outgoing calls have no connection with the incoming talk link.

*Central office trunk calls; 12 and 36 station systems*

With relays 530 and 531 normal, central office trunk calls may come and go the same as if there were no automatic intercommunicating equipment, with the exception of the central office trunk lock out feature, which is optional with this equipment.

*Central office trunk lock-out feature*

With relays 530 and 531 normal it can be seen that the leads 104, 111, 103, 110, 102, 109, 101 and 108 are connected by back contacts to the central office trunk circuits which are leads 504, 511, 503, 510, 502, 509, 501 and 508.

The proper sequence of the trunk pick up leads is from the pick up keys at the station circuit through relays 530 and 531 over leads 504, 511, 503 etc., then through the trunk lock out relay Fig. 2. Thus, the abovementioned leads 504, 511, 503 etc., would connect to leads 204, 211, 203 etc., respectively. For simplicity of the circuit description however, Fig. 2 has been drawn adjacent to Fig. 1, since the circuit operation will be the same as if Fig. 5 were not considered.

If a subscriber at a station such as 112, wished to place an outside trunk call and operated key 121 and lifted the receiver from the switchhook he would operate relay 231 in a circuit traced as follows: ground from the back contact of relay 305, over lead 301 through back contact 221 of relay 231, over lead 201 and lead 101 through the bridge of the station circuit 112 back on lead 108 to 208 through contact 222 of relay 231, through the winding of relay 231 thence over lead 214, lead 114 to lower middle back contacts of pickup key 125 through a series circuit of all the pick up keys to the extra switchhook contact 115 of the station circuit to lead 106 through lower outer contact of relay 532 through contact 543 of relay 530 through the winding of relay 531 to battery. In this circuit the ratio of the resistances of the relays 531 and 231 is such that in this series circuit relay 231 will operate while 531 will not. Relay 231 operates and locks to ground on its upper inner front contact back over lead 214, 114 the series circuit through the pick up keys to lead 106 and battery on the winding of relay 531. In the operation of relay 231, contact 223 must make before any other back contact of said relay breaks, as any two of the back contacts could be in the operating circuit of said relay.

Relay 231 connects all the trunk leads through to central office, however the only trunk pair that has a station bridge on it is on leads 101 and 108 now connected to 302 and 303. Leads 301, 302, and 303 of Fig. 2, pass on to leads 301, 302 and 303 of Fig. 3. Leads 301', 302', 303' etc., of Fig. 2 will also connect to a relay such as shown in Fig. 3. Leads 307 and 308 designate a line to a central office or to a local switchboard. With the station bridge across leads 302 and 303 relay 305 operates from ground at the central office on lead 302 through the winding of relay 305, through the station bridge back on lead 303 to battery at central office. Relay 305 operated places busy tone on lead 301 at front contact of relay 305 to lead 310 which is a busy tone lead of the common tone circuit 304. Each group of three wires such as 301, 302 and 303 from relay 223 is wired to a separate trunk busy relay 305.

*Central office call, trunk busy*

Each station equipped with the trunk lock out feature would require one Fig. 2. Any station not connected to the automatic intercommunicating equipment would require a Fig. 4, or a battery supply through a resistance to take the place of the battery furnished at the 530 relay on lead 106 of stations that are connected to the automatic equipment. Each trunk would require one Fig. 3.

If a succeeding station were to choose a trunk that was already in service, then the relay 305 of that trunk would already be operated and busy tone would be on the common lead 301. Consequently the calling party would receive busy tone in a circuit which is the same as the circuit that operated relay 231 except that the ground at relay 305 is now a ground through a high resistance with a busy tone superimposed thereon.

Consequently the calling party would receive busy tone at his station circuit since it would be in series with the operating path of relay 231.

Relay 231 can not operate however due to the high resistance to ground in the busy tone circuit 304.

*Series make and break circuit at pick up keys*

It can be seen that at the pick up keys such as 121 the springs could be adjusted so that when a key is depressed its spring 131 in swinging from the back contact to the front contact would for an instant cause an open in the locking circuits of relays 231 and 530. In the case of relay 531 it has been specified as being of the slow to release type. Consequently this instantaneous break would not affect the locking circuit of relay 531 if said relay were operated as is the case when a local code number is being selected, however in the case of relays 231 and 530 this instantaneous break in the locking circuit has a definite purpose in the circuit which is to release said relays which must be adjusted to release rapidly.

The purpose of this function is as follows: upon completion of an outside trunk call or an intercom call in which the relays 231 or 530 have been operated a subscriber may desire to place another call. Sometimes it is more expedient to press another trunk button than to operate the switchhook in a normal manner, to disconnect the last call and originate a new one.

If the make and break arrangement were not incorporated in the locking circuit of these relays then said relays would not release while transferring the station circuit from one pick up key to another, consequently it would thus be possible to seize another circuit which might be busy. Therefore it is necessary to have the make and break arrangement in the pick up key series circuit of the locking circuit of said relays to insure the release of same between each key selection.

I claim:

1. In a telephone system, subscribers' stations, each station equipped with a switch hook and an extra switch hook contact, four trunk pick up keys at said stations, an intercommunicating key at said stations, a trunk transfer relay per station, trunks and station pick up key leads and selecting link leads terminating in said trunk transfer relays, said transfer relays under control of station circuits at said subscribers' stations and a signal lead in a series circuit through contacts at all said trunk pick up keys and said extra switch hook contact, a selecting link circuit terminating in four select leads at said trunk transfer relays and consisting of four first digit relays and twelve second digit or supervisory relays, the four select leads associated respectively with the four trunk pick up keys, two digit code numbers, a selecting link busy relay, a link transfer relay per station, select link leads and talk link leads and station pick up key leads terminating in said link transfer relay, four talking links, a talk link busy relay for each talking link, three station group relays per station consisting of, a line, cut-off and a supervisory or last digit relay, a talking circuit consisting of two condensers and battery and ground feeds; means under joint control of said signal lead, said switch hook, said extra switch hook contact and the intercommunicating key to transfer the trunk leads, extending from said trunk transfer relays to the trunk pick up keys at said stations, from trunk circuits to select leads in the said selecting link circuit, means further responsive to the operation of a trunk pick up key to operate a first digit relay and means responsive to the operation of a second trunk pick up key to operate a second digit or called station's supervisory relay; means further responsive upon operation of a called station's supervisory relay to operate the calling station's link transfer relay to transfer said calling station from the selecting leads to the talking links and to operate the line relay of the called station's station circuit to operate an audible signal at the called station; means further responsive upon removal of the receiver at the called station when the intercommunicating button has been operated to operate the cut off relay of the called station to stop the audible signal at said called station and to establish a talking circuit between the calling and the called stations.

2. In a telephone system, subscribers' stations, each station equipped with a switch hook and an extra switch hook contact, four trunk pick up keys at said stations, an intercommunicating key at said stations, a trunk transfer relay per station, trunks and station pick up key leads and selecting link leads terminating in said trunk transfer relays, said trunk transfer relays under control of station circuits at said subscribers' stations and a signal lead in a series circuit through contacts at all said trunk pick up keys and said extra switch hook contact, a selecting link circuit terminating in four select leads at said trunk transfer relays and consisting of four first digit relays and twelve second digit relays and thirty-six last digit or supervisory relays, the four select leads associated respectively with the four trunk pick up keys, three digit code numbers, a selecting link busy relay, a link transfer relay per station, select link leads and talk link leads and station pick up key leads terminating in said link transfer relay, four talking links, a talk link busy relay for each talking link, three station group relays per station consisting of, a line, cut-off and a supervisory or last digit relay, a talking circuit consisting of two condensers and battery and ground feeds; means under joint control of said signal lead, said switch hook, said extra switch hook contact and the intercommunicating key to transfer the trunk leads, extending from said transfer relays to the trunk pick up keys at said stations from trunk circuits to select leads in the said selecting link circuit, means further responsive to the operation of a trunk pick up key to operate a first digit relay and means responsive to the operation of a second trunk pick up key to operate a second digit relay; means further responsive to the operation of a third trunk key to operate a third digit or called station's supervisory relay; means further responsive upon operation of a called station's supervisory relay to operate the calling station's link transfer relay to transfer said calling station from the selecting leads to the talking links and to operate the line relay of the called station's station circuit to operate an audible signal at the called station; means further responsive upon removal of the receiver at the called station when the intercommunicating button has been operated to operate the cut off relay of the called station to stop the audible signal at said called station and to establish a talking circuit between the calling and the called stations.

3. In a telephone system, subscribers' stations, four trunk pick up keys at said stations, an intercommunicating key at said stations, a trunk transfer relay per station, trunks and station pick up key leads and selecting link leads terminating in said trunk transfer relays, a selecting link circuit terminating in four select leads at said trunk transfer relays and consisting of four first digit relays and twelve second digit relays or/and thirty-six last digit or supervisory relays the four select leads associated respectively with the four trunk pick up keys, two or three digit code numbers, a selecting link busy relay, four talking links, a talk link busy relay for each talking link, a link transfer relay per station, select link leads and talk link leads and station pick up key leads terminating in said link transfer relay, three station group relays per station consisting of, a line, cut-off and a supervisory or last digit relay, a talking circuit consisting of two condensers and battery and ground feeds, four talking links one-fourth of the stations grouped in each talk link group according to their last digits in a numbering arrangement whereby one quarter of the stations are in a group in which the last digit of each number is 1, another quarter of the stations are so grouped as to have 2 for their last digit, another group has all code numbers ending in 3 and another group has all numbers ending in 4; means responsive when selecting a code number, to the operation of the last trunk pick up key in the selection of the called station's last digit when the calling station's link transfer relay has been operated to connect the calling station through the trunk pick up key circuit on a talk link common to all stations in that group.

4. In a telephone system, subscribers' stations, two or three digit code numbers, trunk pick up keys at said stations, an intercommunicating key at said stations, a trunk transfer relay per station, trunks and station pick up key leads and selecting link leads terminating in said trunk transfer relays, a selecting link circuit terminating in four select leads at said trunk transfer relays and consisting of four first digit relays and twelve second digit relays or thirty-six last digit or supervisory relays, a link transfer relay per station, select link leads and talk link leads and station pick up key leads terminating in said link transfer relay, a selecting link busy relay, dial tone leads and busy tone leads terminating in said relay and a tone control lead terminating in said relay and extending to the operating paths of all said trunk transfer relays, said busy tone lead having greater resistance to ground than the dial tone lead; means responsive to the operation of an intercommunicating key with the receiver off the switch hook to receive dial tone and operate the associated trunk transfer relay to extend the trunk pick up key leads to the selecting link circuit when said link circuit is not busy and means further responsive to the operation of a trunk transfer relay to operate said selecting link busy relay whereby another subscriber upon operation of a subsequent intercommunicating key with the receiver off the switch hook will receive busy tone and the associated trunk transfer relay will not operate.

5. In a telephone system, subscribers' stations, trunk pick up keys at said stations, an intercommunicating key at said stations, a trunk transfer relay per station, trunks and station pick up key leads and selecting link leads terminating in said trunk transfer relays, a selecting link circuit terminating in four select leads at said trunk transfer relays and consisting of four first digit relays and twelve second digit relays or thirty-six last digit or supervisory relays, two or three digit code numbers, a selecting link busy relay, a link transfer relay per station, select link leads and talk link leads and station pick up key leads terminating in said link transfer relay, three station group relays per station consisting of, a line, cut-off and a supervisory or last digit relay, four talking links, a talk link busy relay for each talking link, busy tone leads and selecting leads terminating in said talk link busy relays the control lead of each said talk link busy relay terminating in the station cut off relays associated with each talk link group and a talk link busy lamp per each talking link associated with said talk link busy relay; means responsive to the operation of a called station's cut off relay to operate said talk link busy relay to place busy tone on the select lead of that talk link group whereby a subsequent station in selecting a station in said busy talking link will receive busy tone when the last digit has been selected; means to prevent access to said busy talk link; means to indicate visually that the associated talk link is busy.

6. In a telephone system, subscribers' stations equipped with a switch hook and an extra switch hook contact, trunk pick up keys at said stations, an intercommunicating key at said stations, a trunk transfer relay per station, trunks and station pick up key leads and selecting link leads terminating in said trunk transfer relays, a selecting link circuit terminating in four select leads at said trunk transfer relays and consisting of four first digit relays and twelve second digit relays or thirty-six last digit or supervisory relays, two or three digit code numbers, a link transfer relay per station, select link leads and talk link leads and station pick up key leads terminating in said link transfer relay, a trunk busy relay per trunk, busy tone leads terminating in said trunk busy relay, a trunk lock out relay per station, trunks and trunk pick up key leads and busy tone leads terminating in said trunk lock out relays, a signal lead in a series circuit through contacts at all said trunk pick up keys and said extra switch hook contact; means under joint control of said signal lead said switch hook and said extra switch hook contact to operate said trunk lock out relay to extend the trunk pick up key leads through to the trunks; means further responsive to operate said trunk busy relay to extend said busy tone to a subsequent subscriber choosing the same trunk, and to prevent access to same trunk.

7. In a telephone system, subscribers' stations, said stations equipped with a switch hook and an extra switch hook contact, trunk pick up keys at said stations, a trunk busy relay per trunk operative on a series winding with said trunk, busy tone leads terminating in said trunk busy relay, a trunk lock out relay per station, trunks terminating in said lock out relays, trunk pick up key leads and busy tone leads terminating in said trunk lock out relays, a signal lead in a series circuit through contacts at all said trunk pick up keys and said extra switch hook contact; means under joint control of said signal lead said switch hook and said extra switch hook contact to operate said trunk lock out relay to extend the trunk pick up key leads through to the trunks; means further responsive to operate said trunk busy relay to extend said busy tone to a subsequent subscriber choosing the same trunk, and to prevent access to same trunk.

8. In a telephone system, subscribers' stations, said stations equipped with a switch hook and an extra switch hook contact, trunk pick up keys at said stations, a trunk busy relay per trunk, busy tone leads terminating in said relay, a trunk lock out relay per station, trunks and trunk pick up key leads and busy tone leads terminating in said trunk lock out relays, a signal lead through said extra switch hook contact and a series circuit through make and break contacts at all trunk pick up keys, said make and break contacts adjusted to break before making; means under joint control of said signal lead said switch hook and said extra switch hook contact to release an associated trunk lock out relay without restoring the receiver to the switch hook when changing from one trunk selection to another by operating a subsequent trunk pick up key.

9. In a telephone system, subscribers' stations, each station equipped with a switch hook and an extra switch hook contact, four trunk pick up keys at said stations, an intercommunicating key at said stations, a trunk transfer relay per station, trunks and station pick up key leads and selecting link leads terminating in said trunk transfer relays, said transfer relays under control of station circuits at said subscribers stations and a signal lead in a series circuit through contacts at all said trunk pick up keys and said extra switch hook contact, a selecting link circuit terminating in four select leads at said trunk transfer relays; means under joint control of said signal lead, said switch hook, said extra switch hook contact and the intercommunicating key to transfer the trunk leads, extending from said trunk transfer relays to the trunk pick up keys at said stations, from trunk circuits to select leads in the said selecting link circuit.

10. In a telephone system, subscribers' stations, each station equipped with a switch hook and an extra switch hook contact, four trunk pick up keys at said stations, an intercommunicating key at said stations, a trunk transfer relay per station, trunks and station pick up key leads and selecting link leads terminating in said trunk transfer relays, said transfer relays under control of station circuits at said subscribers' stations and a signal lead in a series circuit through contacts at all said trunk pick up keys and said extra switch hook contact, a selecting link circuit terminating in four select leads at said trunk transfer relays and consisting of four first digit relays and twelve second digit or supervisory relays, said four first digit relays under control of the said four select leads associated respectively with the four trunk pick up keys, said twelve second digit relays under control of said pick up keys and said first digit relays, two digit code numbers, a selecting link busy relay, four talking links a link transfer relay per station, select link leads and talk link leads and station pick up key leads terminating in said link transfer relay, a talk link busy relay for each talking link, three station group relays per station consisting of, a line relay, a cut-off relay and a supervisory or last digit relay, said link transfer relay under control of a called station's supervisory or last digit relay and the calling station's trunk transfer relay; said cut off relay under control of said supervisory relay a talking circuit consisting of two condensers and battery and ground feeds associated with a called station's station circuit, said line relay under control of said called station's station circuit and an intercommunicating key at said station, an audible signalling device at said called station under control of said cut-off relay and said line relay, said called station's talking circuit always associated only with the respective talking link of said called station; means responsive to the operation of a trunk pick up key, subsequent to the operation of a trunk transfer relay, to operate a first digit relay and means responsive to the operation of a second trunk pick up key to select the talk link associated with the called station and to operate a second digit or called station's supervisory relay; means further responsive upon operation of a called station's supervisory relay to operate the calling station's link transfer relay to transfer said calling station from the selecting leads to the talking links and to operate the cut off relay of the called station's station circuit to operate an audible signal at the called station; means further responsive upon removal of the receiver at the called station when the intercommunicating button has been operated to operate the line relay of the called station to stop the audible signal at said called station and to establish a talking circuit between the calling and the called stations.

References Cited in the file of this patent

UNITED STATES PATENTS

| Number | Name | Date |
|---|---|---|
| 1,633,116 | Lomax | June 21, 1927 |
| 1,635,805 | Wicks | July 12, 1927 |
| 1,747,219 | Bowne et al. | Feb. 18, 1930 |
| 1,810,330 | Wicks | June 16, 1931 |
| 1,889,564 | Ostline et al. | Nov. 29, 1932 |
| 2,308,637 | Babcock et al. | Jan. 19, 1943 |
| 2,332,912 | Hecht et al. | Oct. 26, 1943 |
| 2,381,516 | Powell | Aug. 7, 1945 |
| 2,549,719 | Stehlik | Apr. 17, 1951 |